US007119663B2

(12) United States Patent
Katagiri et al.

(10) Patent No.: US 7,119,663 B2
(45) Date of Patent: Oct. 10, 2006

(54) REMOTE CONTROL KEY FOR PREVENTING THEFT OF TRANSPONDER AND METHOD FOR MANUFACTURING THE SAME

(75) Inventors: Toshiharu Katagiri, Aichi (JP); Yoshihiro Kawai, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 203 days.

(21) Appl. No.: 10/759,629

(22) Filed: Jan. 16, 2004

(65) Prior Publication Data

US 2004/0145450 A1 Jul. 29, 2004

(30) Foreign Application Priority Data

Jan. 29, 2003 (JP) ............................ 2003-020834

(51) Int. Cl.
*H04Q 9/00* (2006.01)
*H04Q 7/00* (2006.01)
*G08C 19/00* (2006.01)
*H01G 9/08* (2006.01)
*H04L 17/02* (2006.01)

(52) U.S. Cl. ................... 340/5.72; 340/10.5; 340/7.63; 340/825.69; 340/825.72; 361/517; 361/535; 341/176

(58) Field of Classification Search ............... 340/5.72, 340/10.5, 7.63, 825.69, 825.72; 361/517, 361/535; 341/176
See application file for complete search history.

(56) References Cited

U.S. PATENT DOCUMENTS 5,331,325 A * 7/1994 Miller ........................ 341/176
5,561,420 A * 10/1996 Kleefeldt et al. .......... 340/5.26
5,604,493 A * 2/1997 Behlke ........................ 341/22
5,798,576 A * 8/1998 Ostermann et al. ........ 307/10.3
5,945,906 A * 8/1999 Onuma ...................... 340/5.62
6,031,524 A * 2/2000 Kunert ....................... 345/173
6,191,703 B1 * 2/2001 Wallace ................. 340/825.69
6,414,586 B1 * 7/2002 Yoshizawa .................. 340/5.2
6,469,616 B1 * 10/2002 Lindner et al. ............ 340/5.26
6,488,425 B1 * 12/2002 Spence et al. .............. 400/714
6,496,100 B1 * 12/2002 Hiebl ......................... 340/5.31
2001/0024158 A1 9/2001 Steinmueller et al.
2003/0000267 A1 1/2003 Jacob et al.

FOREIGN PATENT DOCUMENTS

FR 2 756 584 A1 6/1998
FR 2 802 875 A1 6/2001
JP 9-105255 A 4/1997
JP 2001-140513 A 5/2001
JP 2002-213124 A 7/2002

* cited by examiner

*Primary Examiner*—Jeffery Hofsass
*Assistant Examiner*—Scott Au
(74) *Attorney, Agent, or Firm*—Crompton, Seager & Tufte, LLC

(57) ABSTRACT

A remote control key that may easily be disassembled while preventing theft of its transponder. The remote control key includes a transmitter for transmitting a signal to remotely control locking and unlocking of a door. The transponder transmits a predetermined ID code. A housing retains the transmitter and the transponder. A pad is formed on the housing to operate the transmitter. A seal seals the transponder that is retained in the housing. The seal and the pad are formed from the same material.

25 Claims, 5 Drawing Sheets

1
10
11
12
13
14
15
17
18
19
20
21
22
23
24
X

REMOTE CONTROL KEY FOR PREVENTING THEFT OF TRANSPONDER AND METHOD FOR MANUFACTURING THE SAME

BACKGROUND OF THE INVENTION

The present invention relates to a remote control key for remotely controlling locking and unlocking of a door, and more particularly, to a remote control key that prevents theft of a transponder incorporated in the remote control key.

Japanese Laid-Open Patent Publication No. 2002-213124 describes a prior art example of a vehicle lock that facilitates the locking and unlocking of a vehicle door. The vehicle lock is provided with a remote control key (door key), which includes a transmitter and a transponder. When a lock/unlock button (operation button) of the remote control key is operated, the transmitter transmits a stored ID code. The transponder receives a transponder drive signal from the vehicle and transmits a transponder signal for starting the engine. When receiving the ID code from the remote control key, the vehicle compares the ID code with a stored ID code. If the two ID codes match, the vehicle locks or unlocks the doors. Further, when an ID code included in the transponder signal transmitted from the transponder matches the ID code of the vehicle, the vehicle starts the engine.

Japanese Laid-Open Patent Publication No. 9-105255 describes an example of such a remote control key (ignition key) that separately incorporates a transmitter and a transponder. The remote control key uses electromagnetic energy, which is supplied from the vehicle, to transmit an ID code. Another proposed type of remote control key incorporates a battery to drive a transmitter. The battery generates power and reduces power consumption in the vehicle.

A further proposed type of a remote control key incorporates a transmitter and a transponder, which are formed integrally with each other to reduce the manufacturing steps and manufacturing cost of the remote control key.

It is preferable that the remote control key be easily disassembled to facilitate maintenance, such as replacement of a battery or a transponder. However, when the disassembly of a remote control key is easy, a third person may disassemble the remote control key and remove the transponder. In addition, even if the transponder is removed, the removal of the transponder is not readily noticeable since it is light. Thus, when the remote control key may easily be disassembled, this may lower the security level of the vehicle.

To prevent removal of the transponder, an adhesive agent or the like may be used to make disassembly of the remote control key difficult. However, this would cause difficulties in maintenance for the transmitter of the remote control key.

SUMMARY OF THE INVENTION

It is an object of the present invention to provide a remote control key that enables easy disassembly while preventing theft of the transponder.

To achieve the above object, the present invention provides a remote control key including a transmitter for transmitting a signal to remotely control locking and unlocking of a door. A transponder transmits a predetermined ID code. A housing retains the transmitter and the transponder. A pad is formed on an outer surface of the housing to operate the transmitter. A seal seals the transponder that is retained in the housing. The seal and the pad are formed from the same material.

A further aspect of the present invention is a method for manufacturing a remote control key including a transmitter which transmits a signal to remotely control locking and unlocking of a door, and a transponder. The method includes retaining the transponder in a housing, forming a pad on the housing to operate the transmitter, and sealing the transponder with a material that forms the pad.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A remote control key 1 according to a preferred embodiment of the present invention will now be described with reference to FIGS. 1 to 4(*c*). The remote control key 1 is used in a vehicle keyless entry system.

Figure 1:
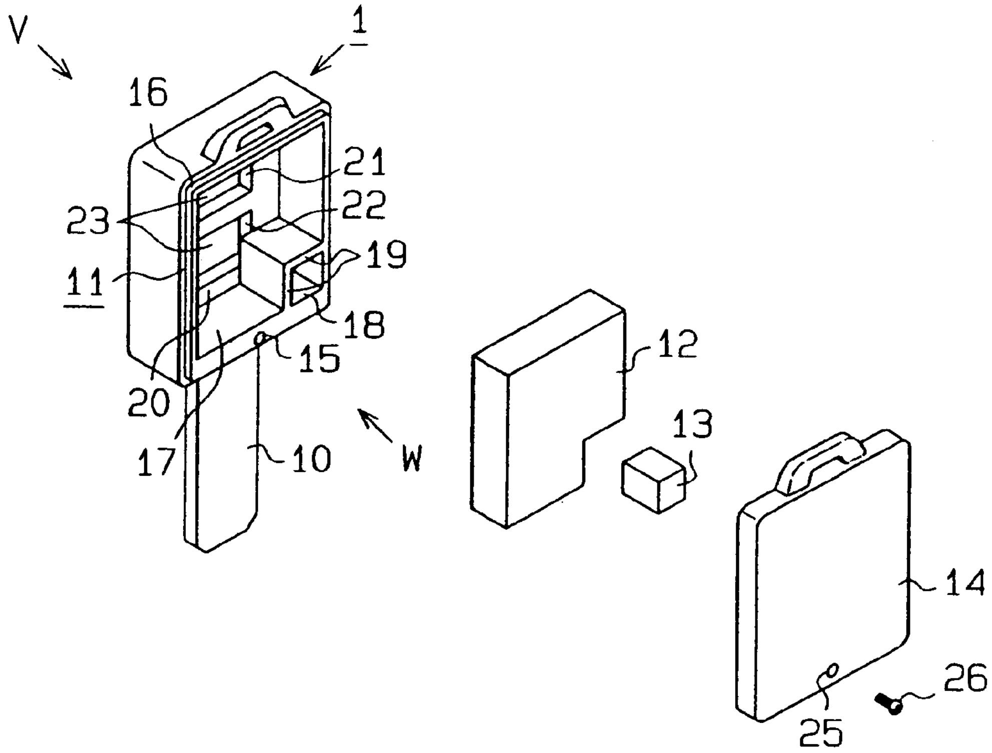
FIG. 1 is an exploded perspective view showing a remote control key according to a preferred embodiment of the present invention.
Figure 2:
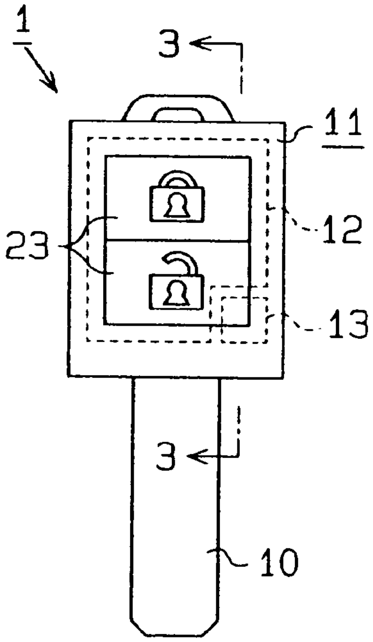
FIG. 2 is a front view showing the remote control key of FIG. 1.

As shown in FIGS. 1 and 2, the remote control key 1 includes a key plate 10, a rectangular housing 11, a transmitter 12, a transponder 13, and a cover 14.

The housing 11 is made of a hard resin, such as polycarbonate-polyethylene terephthalate (PC-PET), polybutylene terephthalate (PBT), acrylonitrile-butadiene-styrene (ABS) resin, and polycarbonate acrylonitrile-butadiene-styrene (PC-ABS). A basal portion of the key plate 10 is insert-molded in the lower portion of the housing 11, as viewed in FIG. 1. A threaded hole 15 is formed in the housing 11 near the position where the key plate 10 is molded in the housing 11. A stepped portion 16 extends along the periphery of the housing 11 on the surface facing towards the cover 14.

The housing 11 has two cavities, that is, a transmitter retainer 17 and transponder retainer 18, which is smaller than the transmitter retainer 17. The housing 11 includes a partition 19, which separates the two cavities from one another. The partition 19 is formed in a corner of the housing 11 between a first inner wall of the housing 11 and a second inner wall, which is adjacent to the first inner wall. The partition 19 includes a first wall extending inward from the first inner wall and a second wall extending from the end of the first wall vertically downward to the second inner wall of the housing 11, as viewed in FIG. 1. The transmitter retainer 17 and the transponder retainer 18 respectively retain the transmitter 12 and the transponder 13. The dimensions of the transponder retainer 18 are slightly greater than that of the transponder 13. This creates a gap between the transponder retainer 18 and the transponder 13.

Figures 3A, 3B, 3C, 3D:
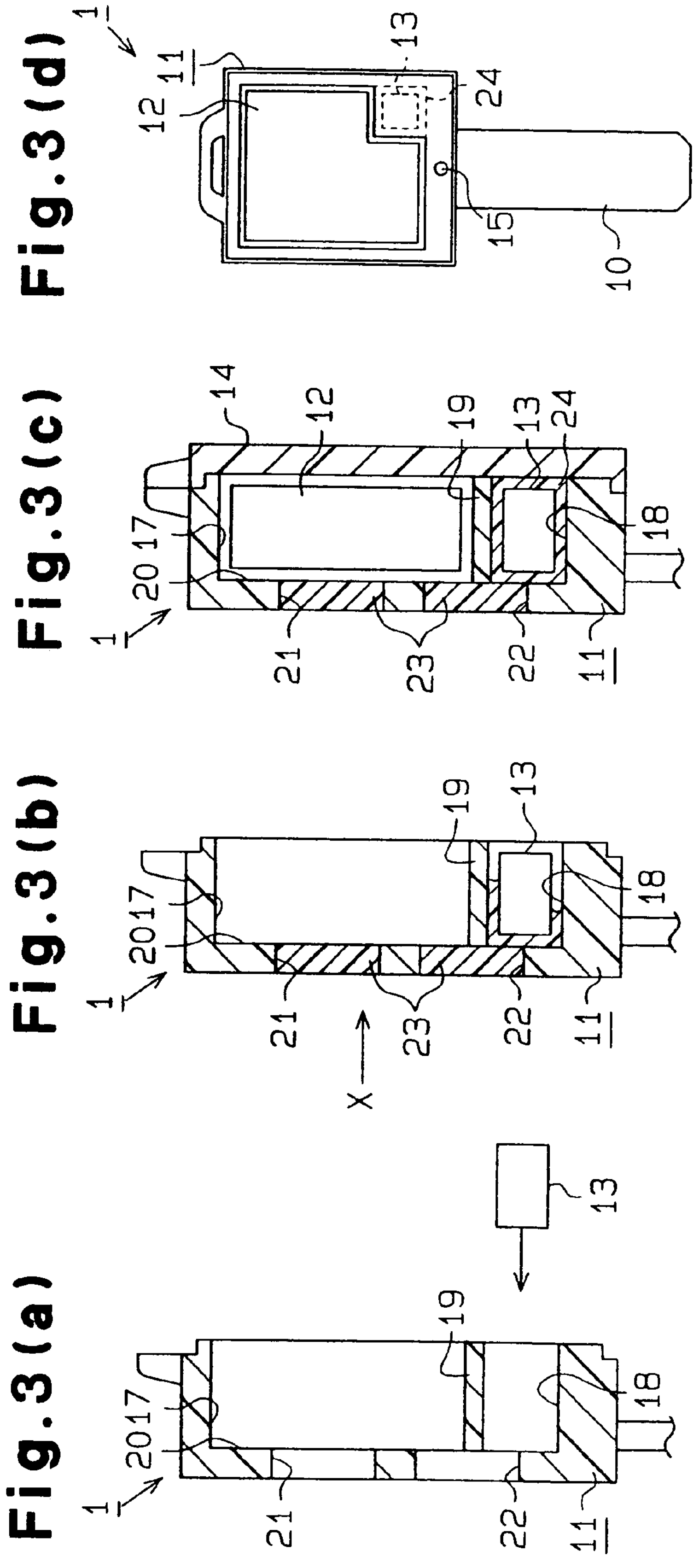
FIGS. 3(*a*) to 3(*c*) are cross-sectional views taken along line 3—3 in FIG. 2 showing procedures for forming an operation pad and a seal in a housing, and FIG. 3(*d*) is a rear view showing the remote control key before a cover is connected to the housing.

The housing 11 has a bottom wall 20. A lock button receptacle 21 extends through an upper portion of the bottom wall 20 (the portion separated from the key plate 10 as viewed in FIG. 1) in the transmitter retainer 17. An unlock button receptacle 22 extends through the bottom wall 20 under the lock button receptacle 21 (the portion close to the key plate 10) in the transmitter retainer 17 and part of the transponder retainer 18. Thus, the transponder retainer 18 is connected with the unlock button receptacle 22, as shown in FIG. 3(*a*). The lock button receptacle 21 and the unlock button receptacle 22 have the same shapes.

Figure 4C:
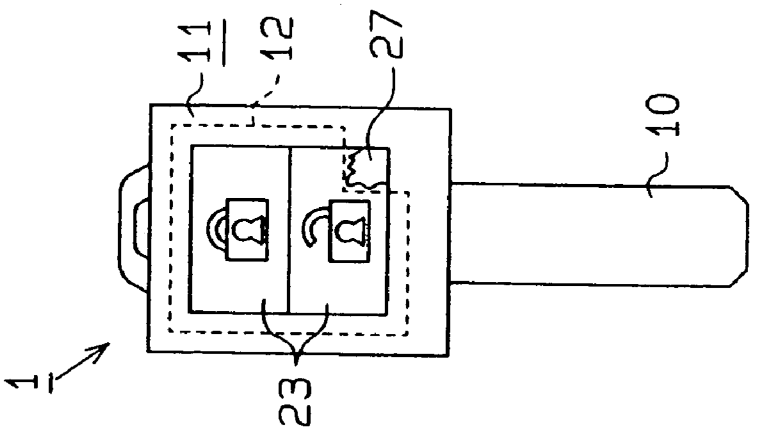
FIGS. 4(*a*) and 4(*b*) are cross-sectional views taken along line 3—3 in FIG. 2 showing the remote control key when theft of the transponder leaves a mark on the outer surface of the remote control key when the transponder is stolen, and FIG. 4(*c*) is a front view showing the remote control key when theft of the transponder leaves a mark on the outer surface of the remote control key.
Figure 4B:
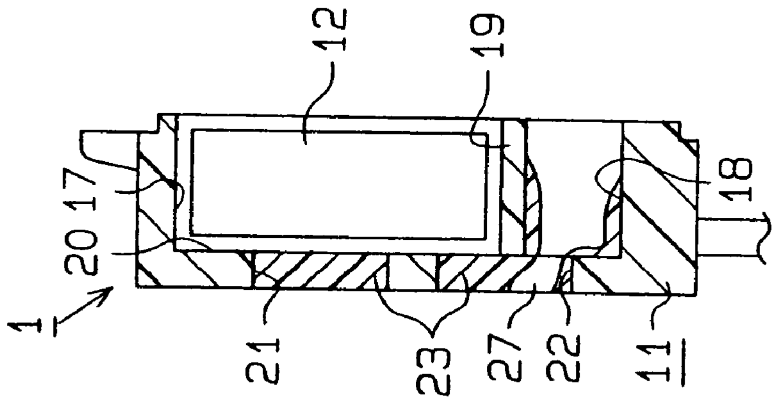
Figure 4A:
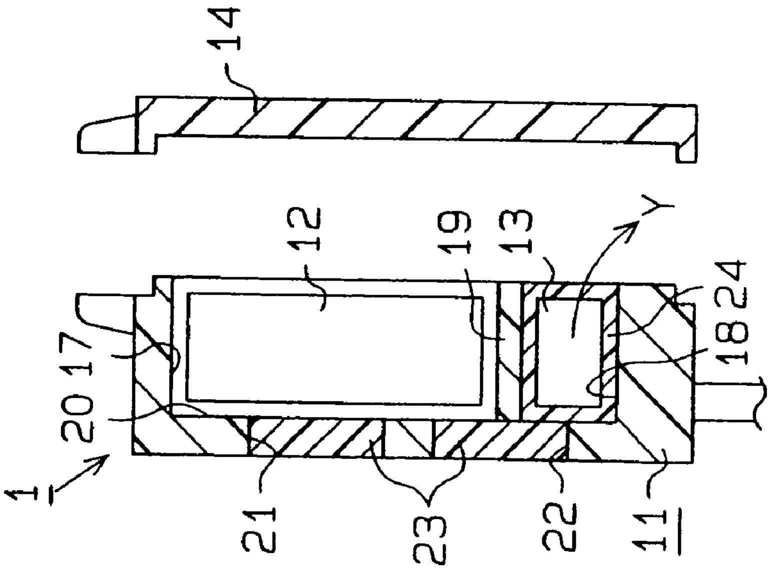

Referring to FIGS. 2 to 4(*c*), a flexible material, such as TPEE (polyester elastomer), TPU (polyurethane elastomer), fluoro rubber, and TPEA (polyamide elastomer), is filled in the lock button receptacle 21 and the unlock button receptacle 22 of the housing 11. This forms pads 23 integrally with the lock button receptacle 21 and the unlock button receptacle 22. The unlock button receptacle 22 is connected with the transponder retainer 18. Thus, when the pads 23 are being formed, the flexible material is also filled in the transponder retainer 18. As a result, the transponder 13 is covered by the flexible material when retained in the transponder retainer 18.

The transponder 13 incorporates an antenna coil, a transformer, a capacitor, and an IC (none of which are shown). In the transponder 13, the antenna coil generates current when influenced by the magnetism of a magnetism generator (not shown), which is incorporated in the key cylinder of the vehicle. In accordance with the current, charge is stored in the capacitor via the transformer. When the voltage of the charged capacitor reaches a predetermined value, the transponder 13 transmits a transponder signal, which includes a predetermined ID code stored in the IC. The transponder signal of the transponder 13 is received by a receiver (not shown), which is incorporated in the key cylinder. The engine is started only when the ID code included in the transponder signal from the transponder 13 matches an ID stored in an engine control computer (e.g., electronic control unit). Since the transponder 13 uses electric energy that is stored in this manner, the transponder 13 does not have to have a power source that requires replacement, such as a battery.

The formation of the pads 23 and the sealing of the transponder 13 will now be discussed with reference to FIGS. 3(*a*) to 3(*d*).

In a state in which the transponder 13 is retained in the transponder retainer 18 (FIG. 3(*a*)), the housing 11 is set in a mold (not shown). Then, flexible material (indicated by the hatching lines in FIG. 3(*b*)) is filled in the lock button receptacle 21 and the unlock button receptacle 22 in the direction indicated by arrow X (the direction from the lock button receptacle 21 and the unlock button receptacle 22 toward the transmitter retainer 17). Since the unlock button receptacle 22 is connected with the transponder retainer 18, the flexible material also fills the gap between the transponder retainer 18 and the transponder 13 from the unlock button receptacle 22. Thus, as shown in FIG. 3(*c*), the flexible material fills the transponder retainer 18. This covers and seals the transponder 13 with the flexible material. In this manner, a seal 24 that seals the transponder 13 is formed integrally with the pad 23 in the same operation. Accordingly, the sealed transponder 13 is not visible from the outer side as shown in FIG. 3(*d*). FIG. 3(*d*) is a view of the housing 11 taken in the direction of arrow W in FIG. 1. When the transponder 13 is sealed in the housing 11, the transmitter 12 is retained in the transmitter retainer 17.

The transmitter 12 is a module that transmits an ID signal requesting the closing of the locks when the pad 23 corresponding to the lock button receptacle 21 is pushed and transmits an ID signal requesting the opening of the locks when the pad 23 corresponding to the unlock button receptacle 22 is pushed. The ID signals include ID codes unique to the vehicle and codes for requesting the closing or opening of the locks.

After the transmitter 12 and the transponder 13 are retained in the housing 11 of the remote control key 1, the cover 14 is fitted to the stepped portion 16 of the housing 11. Then, a screw 26 is inserted through a screw hole 25, which extends through the cover 14, and fastened with the threaded hole 15 of the housing 11. This completes the remote control key 1.

When performing maintenance, such as replacement of the battery (not shown) of the transmitter 12 or replacement of the transmitter 12 with another transmitter 12, the transmitter 12 is removed from the transmitter retainer 17. In this case, the screw 26 is disengaged from the threaded hole 15, and the cover 14 is taken off from the housing 11. Then, force is applied to the pad 23 to remove the transmitter 12 from the transmitter retainer 17. This facilitates maintenance of the transmitter 12.

The state of the remote control key 1 when the transponder 13 is removed will now be described in detail with reference to FIGS. 4(*a*) to 4(*c*).

Referring to FIG. 4(*a*), when removing the transponder 13 from the transponder retainer 18, a shearing force is produced between the transponder retainer 18 and the transponder 13. The shearing force acts to separate the transponder retainer 18 and the transponder 13. Further, the shearing force exfoliates the flexible material around the transponder 13 from the transponder retainer 18.

As described above, the pad 23 and the transponder 13 are formed integrally with each other. Thus, referring to FIG. 4(*b*), when a shearing force is produced between the transponder retainer 18 and the transponder 13, a shearing force is also applied to part of the pad 23 that is exposed from the outer surface of the housing 11. As a result, the outer surface of the pad 23 is partially sheared or deformed. A shearing or deformation mark 27 is left on the outer surface of the pad 23. In other words, as shown in FIG. 4(*c*), the removal of the transponder 13 leaves a mark 27 on the outer surface of the housing 11.

The remote control key 1 of the above embodiment has the advantages described below.

(1) The transponder 13 is sealed by the same flexible material as that forming the pads 23 in the outer surface of the housing 11. Thus, even if a third person opens the cover 14 of the remote control key 1 to steal the transponder 13, the transponder 13 cannot be seen. Thus, it is difficult to confirm the position of the transponder 13 and remove the transponder 13. This prevents theft of the transponder 13.

(2) The transponder 13 is sealed by the same flexible material as that forming the pads 23 in the outer surface of the housing 11. Thus, there is no need to separately prepare seals. This reduces the manufacturing cost of the remote control key 1.

(3) The unlock button receptacle 22 is connected with the transponder retainer 18. Thus, the flexible material enters the transponder retainer 18 from the unlock button receptacle 22. As a result, the formation of the pads 23 and the sealing of the transponder 13 are performed simultaneously. This decreases the number of steps that are performed when manufacturing the remote control key 1 and reduces the manufacturing costs.

(4) The pad 23 and the transponder 13 are formed integrally with each other. In addition, the pad 23 is formed in the surface of the housing 11. Thus, when the transponder 13 is removed from the housing 11, a mark 27 formed when the flexible material is sheared or deformed is left on the pad 23. Accordingly, by looking at the mark 27 left on the outer surface of the housing 11, the user would notice the theft of the transponder 13. The pads 23 are formed from the flexible material. Thus, when the transponder 13 is stolen, the pads 23 are easily deformed and traces of the theft tend to remain in the pads 23. This ensures that the user notices that the transponder 13 has been stolen.

(5) The seal 24 is formed integrally with one of the pads 23. Thus, the shearing force produced when removing the transponder 13 from the transponder retainer 18 is transmitted to the pad 23. In addition, the unlock button receptacle 22 and the transponder retainer 18 are overlapped with each other. This improves the transmission of the shearing force. Thus, the traces produced when removing the transponder 13 tends to remain in the outer surface of the pad 23. As a result, the mark 27 makes it further easier for the user to notice that the transponder 13 has been stolen.

(6) The screw 26, which is inserted through the screw hole 25 and fastened with the threaded hole 15, integrates the housing 11 and the cover 14. Thus, the remote control key 1 is easily disassembled by removing the screw 26 from the threaded hole 15. Afterward, the transmitter 12 may be removed from the transmitter retainer 17. Accordingly, maintenance of the transmitter 12 is facilitated.

It should be apparent to those skilled in the art that the present invention may be embodied in many other specific forms without departing from the spirit or scope of the invention. Particularly, it should be understood that the present invention may be embodied in the following forms.

Figures 5A, 5B, 5C, 5D:
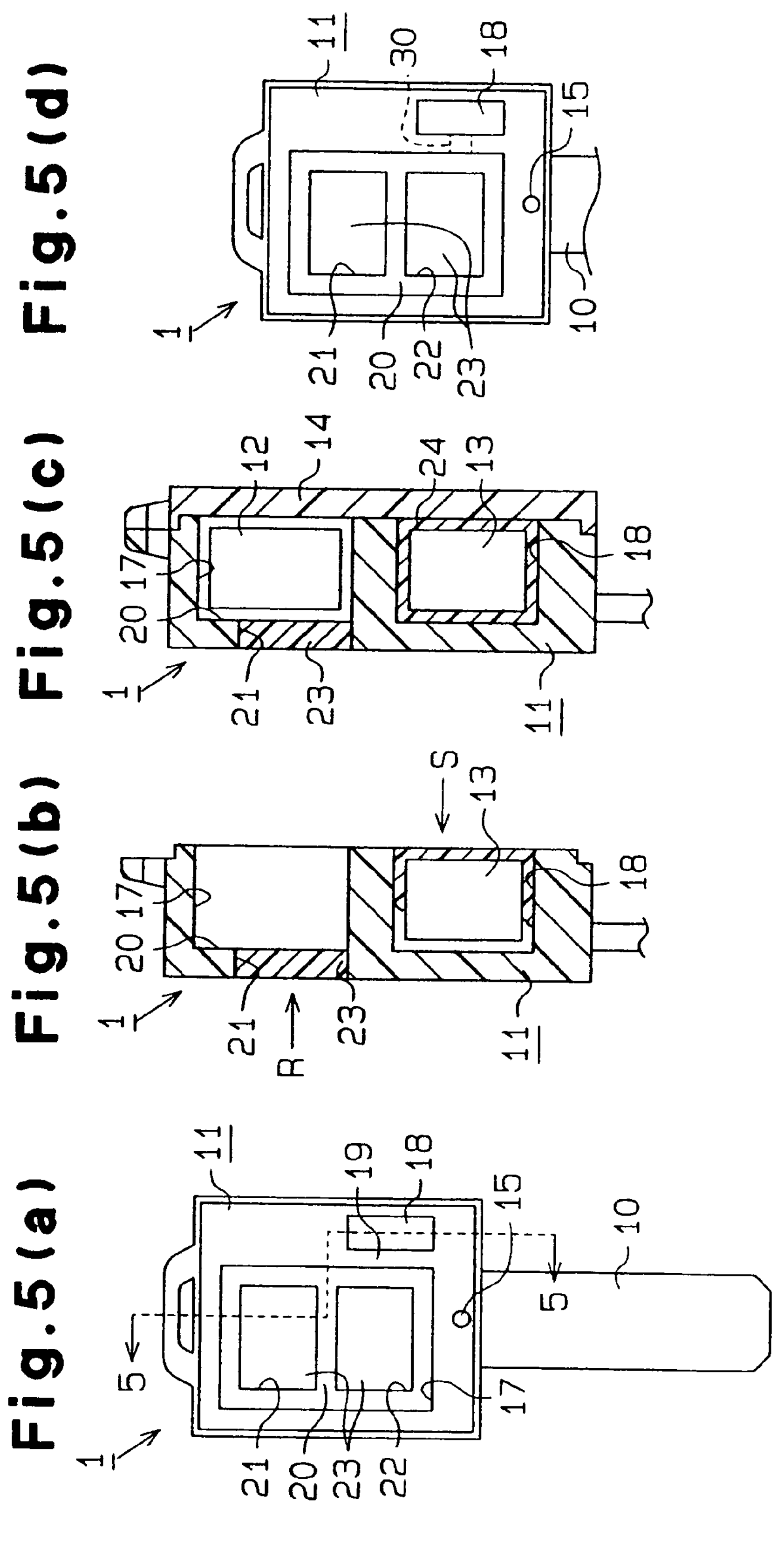
FIGS. 5(*a*) and 5(*d*) are front views showing a remote control key according to a further embodiment of the present invention, and FIGS. 5(*b*) and 5(*c*) are cross-sectional views taken along line 5–5 in FIG. 5(*a*)

The unlock button receptacle 22 and the transponder retainer 18 do not have to overlap each other. For example, as shown in FIG. 5(*a*), the lock button receptacle 21 and the unlock button receptacle 22 may be formed in the bottom surface of the transmitter retainer 17. Further, as shown in FIG. 5(*b*), after the transponder 13 is retained in the transponder retainer 18, a flexible material is filled in the lock button receptacle 21 and the unlock button receptacle 22 in the direction indicated by arrow R (the direction from the lock button receptacle 21 and the unlock button receptacle 22 toward the transmitter retainer 17) and in the transponder retainer 18 in the direction indicated by arrow S (the direction toward the transponder retainer 18). This forms the pads 23 and seals the transponder 13 as shown in FIG. 5(*c*). In other words., the unlock button receptacle 22 and the transponder retainer 18 do not have to be connected with each other, and the formation of the pads 23 and the sealing of the transponder 13 may be performed separately if necessary.

Further, in a remote control key 1 in which the unlock button receptacle 22 and the transponder retainer 18 do not overlap each other, a communication hole 30 may be formed between the transmitter retainer 17 and the transponder retainer 18, as shown in FIG. 5(*d*). In this case, the flexible material that enters the lock button receptacle 21 and the unlock button receptacle 22 flows through the communication hole 30 and fills the gaps between the transponder retainer 18 and the transponder 13. As long as the formation of the pads 23 and the sealing of the transponder 13 are performed simultaneously, the relative positions of the lock button receptacle 21, the unlock button receptacle 22, and the transponder retainer 18 are not limited.

Figure 6:
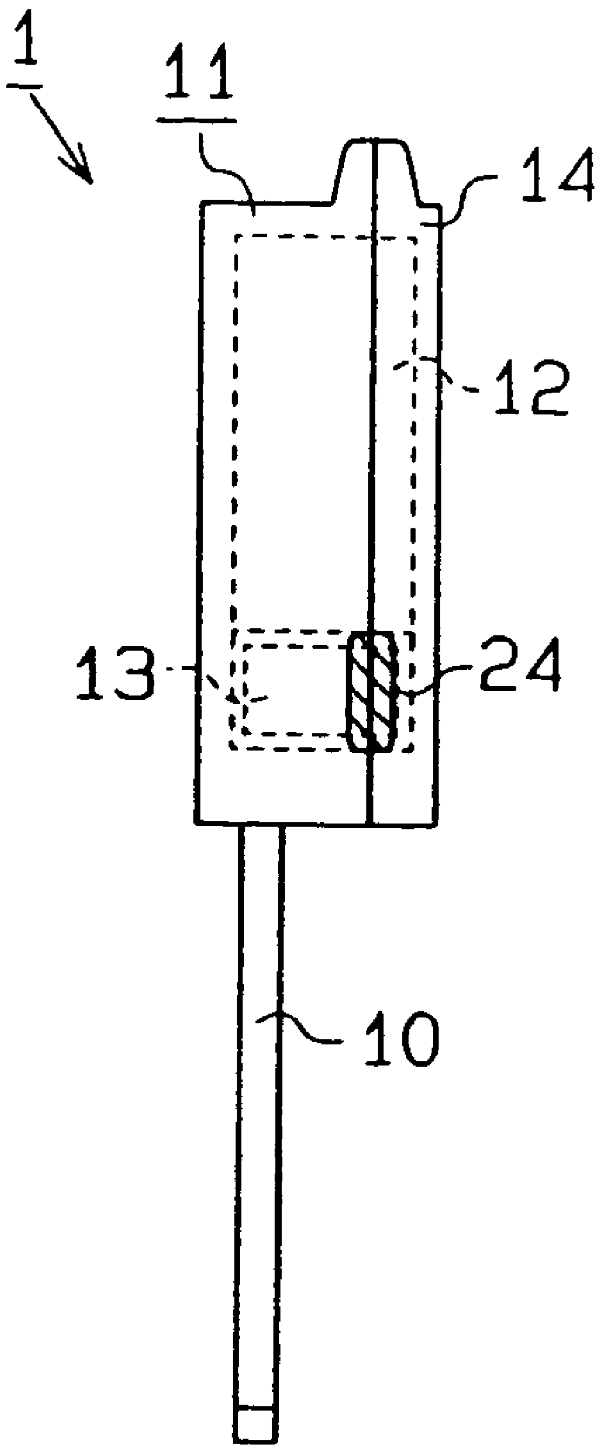
FIG. 6 is a side view showing a remote control key according to a further embodiment of the present invention.

In the remote control key 1 of the preferred embodiment, traces of removal of the transponder 13 are left on the outer surface of the pad 23. However, the location of such traces is not limited to the outer surface of the pads 23. For example, as shown in FIG. 6, the housing 11 and the cover 14 may be formed so that the seal 24 is partially exposed from the joining surfaces of the housing 11 and the cover 14 so that removal of the transponder 13 leaves traces on the exposed seal 24. This prevents loosening of the screw 26 with the elasticity of the exposed seal 24. Further, the housing 11 and the cover 14 may be formed so that the seal 24 is exposed along the entire periphery of the joining surfaces of the housing 11 and the cover 14. In this case, the seal 24 functions as a packing and makes the remote control key 1 water resistant. The seal 24 does not have to be exposed from the joining surfaces of the housing 11 and the cover 14 and may be exposed anywhere on the outer surface of the remote control key 1.

In the preferred embodiment, the partition 19 is formed between the transmitter retainer 17 and the transponder retainer 18. Thus, the partition 19 restricts the moving direction of the flexible material entering the transponder retainer 18. As a result, the seal 24 is formed integrally with the pads 23. However, the partition 19 does not necessarily have to be formed. If there is no partition 19, for example, a mold may be used to restrict the direction in which the flexible material moves when the flexible material enters the transponder retainer 18. This would also enable the formation of the pads 23 and the sealing of transponder 13 to be performed simultaneously. In other words, the structure of the housing 11 is not limited as long as the formation of the pads 23 and the sealing of the transponder 13 are performed simultaneously.

The flexible material may be filled in the lock button receptacle 21 and the unlock button receptacle 22 in a direction from the transponder retainer 18 toward the lock button receptacle 21 and the unlock button receptacle 22 that is opposite to the direction indicated by arrow X in FIG. 3(*b*) to seal the transponder 13 and form the pads 23.

In the preferred embodiment, the cover 14 is attached to the housing 11 by fastening the screw 26 with the threaded hole 15. However, the threaded hole 15 and the screw 26 do not have to be used. For example, resin hooks that engage each other may be arranged in the housing 11 and the cover 14 to attach the cover 14 to the housing 11. Since this would eliminate the need for the screw 26, manufacturing costs for the remote control key 1 would be reduced.

In the preferred embodiment, there is a gap between the entire periphery of the transponder 13 and the transponder retainer 18. However, any side of the transponder 13 may be in contact with the transponder retainer 18. This would enable the transponder 13 to be positioned in the transponder retainer 18. This would also prevent displacement of the transponder 13 when sealing the transponder 13.

The present examples and embodiments are to be considered as illustrative and not restrictive, and the invention is not to be limited to the details given herein, but may be modified within the scope and equivalence of the appended claims.

What is claimed is:

1. A remote control key comprising:

a transmitter for transmitting a signal to remotely control locking and unlocking of a door;

a transponder for transmitting a predetermined ID code;

a housing for retaining the transmitter and the transponder;

a pad formed on an outer surface of the housing to operate the transmitter; and a seal formed around the transponder that is retained in the housing, wherein the seal and the pad are formed from the same material.

2. The remote control key according to claim 1, wherein the transponder is sealed so that removal of the transponder from the seal partially exfoliates the seal and leaves a removal mark on the outer surface of the housing.

3. The remote control key according to claim 1, wherein the pad and the seal are formed integrally with each other.

4. The remote control key according to claim 1, wherein the seal is partially exposed from the outer surface of the housing.

5. The remote control key according to claim 1, wherein at least pan of the pad is overlapped with the seal.

6. The remote control key according to claim 1, wherein the pad and the seal are connected to each other.

7. The remote control key according to claim 1, wherein the pad and the seal are formed from a flexible material.

8. The remote control key according to claim 7, wherein the flexible material is an elastomeric material.

9. The remote control key according to claim 1, wherein the housing includes a first retainer for retaining the transmitter and a second retainer for retaining the transponder.

10. The remote control key according to claim 9, wherein the housing includes a receptacle connected with the first retainer and partially connected with the second retainer.

11. The remote control key according to claim 1, wherein the housing includes a partition for defining a retainer which retains the transponder, and a receptacle in which the pad is formed, and wherein the receptacle is connected with the retainer.

12. The remote control key according to claim 1, further comprising a cover attached to the housing to cover the transmitter and the transponder, wherein the seal is exposed from joining surfaces of the housing and the cover.

13. The remote control key according to claim 1, further comprising a cover attached to the housing to cover the transmitter and the transponder, wherein the seal covers the entire transponder so that the transponder is not visible from the exterior when the cover is removed from the housing.

14. The remote control key according to claim 1, further comprising a cover attached to the housing to cover the transmitter and the transponder, and a screw for fastening the cover to the housing.

15. A method for manufacturing a remote control key including a transmitter which transmits a signal to remotely control locking and unlocking of a door, and a transponder, the method comprising:

retaining the transponder in a housing;

forming a pad on the housing to operate the transmitter, and sealing around the transponder retained in the housing with a material that forms the pad.

16. The method according to claim 15, wherein said sealing the transponder includes seating the transponder with a seal formed integrally with the pad.

17. The method according to claim 15, further comprising:

retaining the transmitter in the housing; and attaching a cover to the housing with a screw.

18. The method according to claim 17, wherein said sealing the transponder includes covering the entire transponder with the seal so that the transponder is not visible from the exterior when the cover is removed from the housing.

19. The method according to claim 17, wherein said sealing the transponder includes sealing the transponder with a seal that is exposed from an outer surface of the housing or the cover.

20. The method according to claim 15, wherein said forming a pad includes forming the pad from a flexible material.

21. The method according to claim 20, wherein the flexible material is an elastomeric material.

22. The method according to claim 15, wherein said sealing the transponder includes sealing the transponder with a seal overlapped width at least part of the pad.

23. The method according to claim 15, wherein said sealing the transponder includes sealing the transponder with a seal connected to the pad.

24. The method according to claim 15, wherein the housing includes a first retainer for retaining the transmitter and a second retainer for retaining the transponder.

25. The method according to claim 24, wherein the housing includes a receptacle connected to the first retainer and partially connected with the second retainer, said forming the pad includes filling material for forming the pad in the receptacle, and said sealing the transponder includes sealing the transponder with the material filled in the receptacle.

* * * * *